Figure 1:
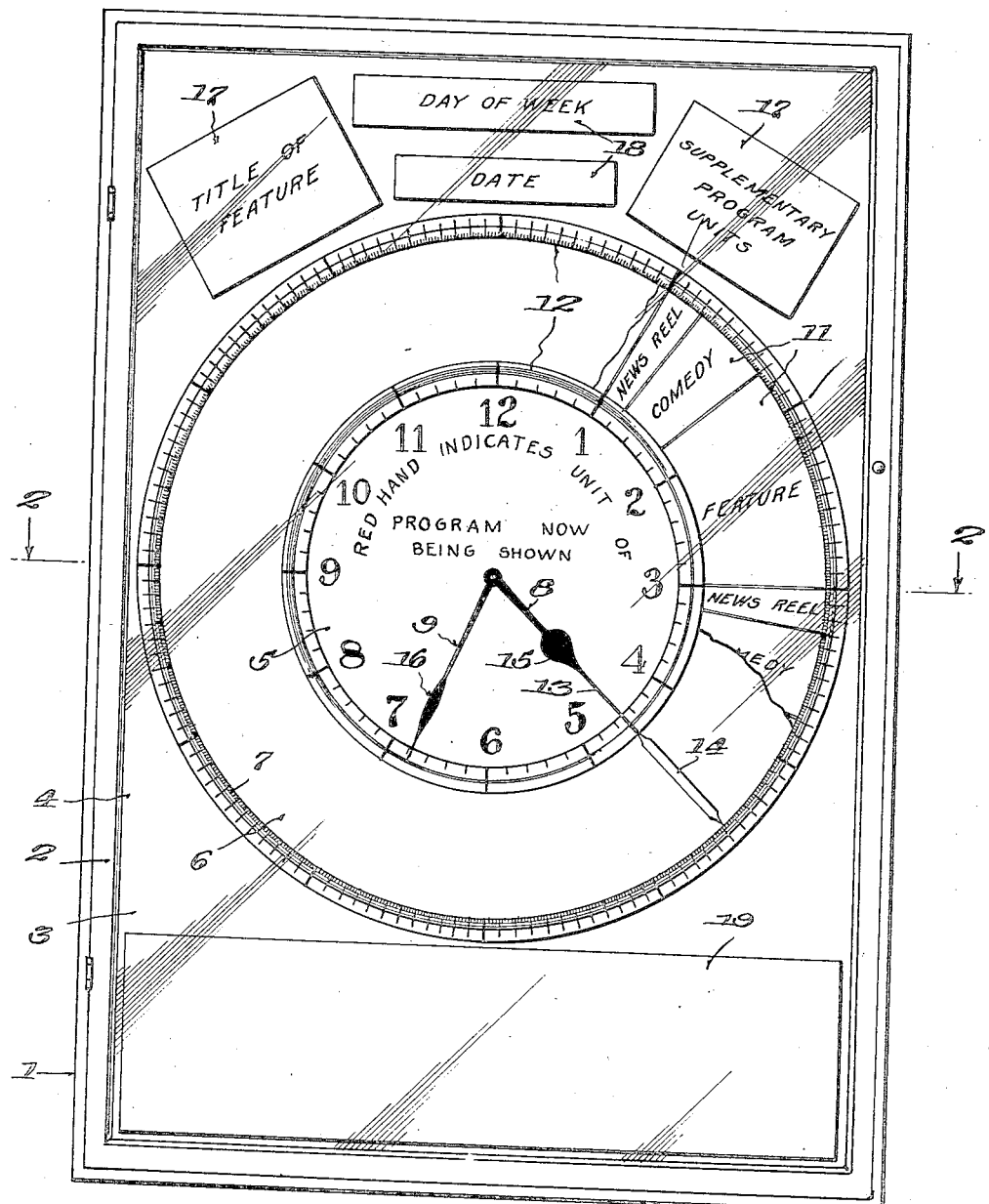

Jan. 7, 1936.　　　F. H. THOMAS　　　2,027,006
PROGRAM CLOCK
Filed April 20, 1931

Inventor
FRITZ H. THOMAS,
Depe + Kirchner
Attorneys

Patented Jan. 7, 1936

2,027,006

UNITED STATES PATENT OFFICE 2,027,006

PROGRAM CLOCK

Fritz Hugh Thomas, Greeneville, Tenn., assignor, by direct and mesne assignments, to Program Clock, Inc., Knoxville, Tenn., a corporation of Tennessee Application April 20, 1931, Serial No. 531,583

2 Claims. (Cl. 58—126)

My invention relates to indicators, and more particularly to an instrument for indicating a continuous, progressive relationship existing between the passage of time and the occurrence of a definite predetermined cycle of events.

An object of the invention is to indicate visually the time of beginning, time of ending, and total time-length of an occurrence which takes place through a predetermined length of time, and to indicate visually at any definite time during the progress of the occurrence the true ratio subsisting at that time between the past and the future time-portions of the occurrence.

A further object is to provide an instrument adapted to indicate at any time the present relationship at that time between the several elements of a cycle of occurrences of predetermined time-length.

A specific practical embodiment of my invention resides in the provision of a program clock, i. e., an instrument including a fundamentally more or less conventional timepiece combined with means for indicating at any time the progress at that time of the several component elements of a theatrical program or the like.

A specific object of the invention when embodied in a program clock is to provide means for indicating visually the current state of progress of a theatrical program or the like, whereby an observer of the instrument may be apprised of the extent of the program which has already been enacted, the character of the past portion of the program, the character and extent of the future portion of the program, the absolute time at which a future repetition of the units of a program or a cycle of programs will begin, and the length of time which must elapse before a future unit in the cycle will reoccur.

One specific utility of the invention when thus embodied is as follows:

The program clock may be displayed at the entrance to a theatre such for example as a motion picture house where each program includes several distinct component elements. These elements may consist of two or more complete and independent photoplays. The program clock is adapted to indicate to a prospective patron of the theatre, not only the current absolute time, but also the present progress of the program being exhibited in the theatre. Thus, the program clock will indicate, to take a particular example, to a prospective patron who observes the instrument at 9:30 o'clock, that at that time a showing of the major and more important portion of the program (commonly designated the "feature") has not yet commenced, that at that time a particular comedy, news reel or the like (constituting one of the supplemental or minor elements of the program) is being exhibited, and that only five minutes will be required to complete the showing of the minor element and begin the showing of the feature. The program clock is thus capable of conveying at all times vividly and simultaneously to an indefinitely large number of prospective patrons such information as has prior to my invention been made available only upon each one of such persons making special inquiry of a theatre attendant.

More particular objects of the invention when specifically embodied in a program clock comprise the provision of novel mechanical instrumentalities adapted to effect the foregoing and other objects and advantages, including especially the provision of a novel clock hand, clock hand extension, and the combination of such elements with an area provided on the face of the instrument bearing indicia characteristic of a program currently on exhibition.

Other and further objects, advantages and details of the invention will be sufficiently apparent from the description hereinafter of the invention, in a certain preferred exemplification.

Figure 2:
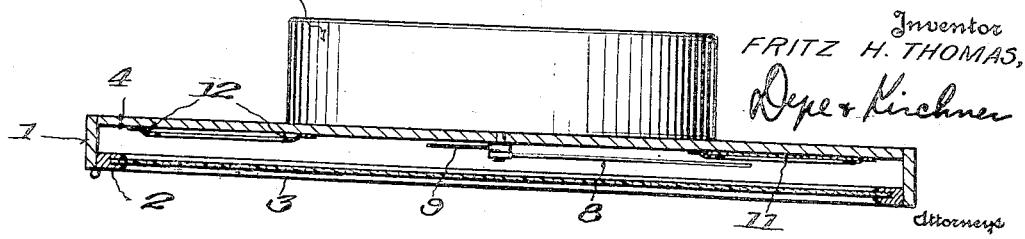

In the accompanying drawing which forms part of this application for Letters Patent, Figure 1 is a front elevational view of the invention embodied in a theatrical program clock; and Fig. 2 is a cross sectional view taken along the line 2—2 of Fig. 1.

Referring now to the drawing, the reference numeral 1 designates a frame which may conveniently be made rectangular in shape and relatively shallow. A door 2, containing a transparency 3 of glass or the like, may be hinged at one side of the front of the frame. The back of the frame forms a face 4. At the central portion of the face 4 a clock dial 5 is provided carrying in a circular band near its outer periphery the conventional hour numerals and being provided with the customary time graduation indicia at its periphery outwardly of the circular band of hour numerals, all as is well known and standard in the timepiece art.

The face 4, outwardly of the clock dial 5, is provided with an annular area 6 of any convenient width, which is concentric with the central clock dial portion. The outer periphery of the annular area 6 may be inscribed with a circular time division band 7.

The clock dial is provided with an hour hand 8 and a minute hand 9, driven by any suitable clock motor mechanism carried in a housing 10 fixed to the rear of the face 4. The annular area 6 is adapted to carry interchangeable detachable arcuate segments 11, which may conveniently consist of paper or card sections received and held beneath oppositely directed spaced flanges 12, 12, provided at the opposite edges of the annular area 6, as best shown in Fig. 2.

The minute hand 9 is made longer than the hour hand 8 according to the usual clock making practice. One of the two hands, preferably the hour hand 8, is provided with an extension consisting of a relatively narrow and inconspicuous portion 13 formed on the free end of the hour hand proper and a relatively wide and conspicuous end portion 14 formed on the outer end of the portion 13. The inconspicuous intermediate portion 13 is adapted to traverse the circular band of hour numerals provided on the clock dial, and the wider and more conspicuous portion 14 is adapted to traverse the annular area 6 and the segments 11 carried thereby. Preferably the outer and free end of the hour hand extension portion 14 is sharply pointed and moves along the circular time division band 7 formed at the outer periphery of the annular area 6.

It will be apparent that by means of the novel hour hand and extension therefor just described I have provided an hour hand structure which is actually longer than the cooperating minute hand, but which, by reason of the novel combination of an inconspicuous intermediate portion 13 and a relatively conspicuous free end portion 14, creates an illusion that the hour hand is shorter than the minute hand. I am thus enabled to utilize the movement of the hour hand for indicating purposes in the outer annular area 6, without in any way causing the observer of the clock to mistake the hour hand for the minute hand. The illusion effect is heightened by providing at the end of the hour hand proper, inwardly of the inconspicuous intermediate portion 13, a characteristic hand enlargement 15 which is positioned appreciably closer to the common center of the dial 5 and the annular area 6 than is the corresponding enlargement 16 which is formed at the outer end of the minute hand 9.

The detachable segments 11 carried in the annular area 6 are provided with suitable legends each indicative of the character of a particular program unit. Each segment 11 is positioned in the annular area 6 between the two concentric time division bands which are formed at the outer peripheries of the clock dial portion and the annular area respectively, and each segment, bearing its appropriate program unit legend is positioned adjacent that arc on the time division bands which is traversed by the hour hand and its extension during the showing of a particular program unit.

Thus, let it be supposed that a given program consists of a feature photo play and supplementary units comprising a news reel and a comedy. If the showing of an entire program requires two hours, beginning on the odd hours, and if the program is begun by the showing of a news reel requiring fifteen minutes, followed by a showing of a comedy requiring thirty minutes, and is closed by a showing of a feature photo play requiring an hour and a quarter, the several segments covering the showing of one complete program will be proportioned and inscribed as shown in Fig. 1. It will be understood that the several unit program segments disposed in the portion of the annular area 6 between hour numerals 1 and 3, in Fig. 1, will be repeated throughout the entire extent of the annular area 6 or through so much of such area as may be required for a single day's operation of the theatre.

It is believed to be apparent that a program clock arranged as shown in Fig. 1 will indicate at once to any observer the following facts:

The character of each of the several program elements;

The time length required for the showing of each unit, indicated by the arcuate length of each of the segments 11;

The time at which the showing of each of the units begins and ends, indicated by the radial edges of each of the segments, and their positions with relation to the two time division bands;

The current condition and progress of the program at the time at which the clock is observed, indicated by the relationship existing between the conspicuous end portion 14 of the hour hand extension and the several segments 11.

I prefer to have inscribed on the segments 11, for the sake of brevity and to permit the use of relatively large letters, only the generic nature of the program units, as shown in Fig. 1. The upper portion of the rectangular face 4 may be provided with suitable spaces 17, 17, in which more detailed information may be carried descriptive of the specific character of each of the program units. In additional spaces 18 further legends may be shown, indicative of the day of the week, the date, etc., as may be desired. Still another space 19 may be provided in the lower portion of the face in which further information may be displayed, which may relate to other details of the current program, future programs or the like.

To emphasize the divisions between each of the several segments 11, and consequently the time length of each, these segments may be provided in staggered contrasting colors. For the purpose of emphasizing the presence and particular position at any given time of the hour hand extension end portion 14 this portion is preferably colored to contrast with the colors of the several segments 11 which it traverses. In order that the appreciable width of the extension end portion 14 may not, at various positions in its movement, obscure the divisions between adjacent segments 11, the portion 14 is preferably made substantially transparent.

In the embodiment of the invention shown in the drawing I have provided an outer time division band 7, in which each hour arc is divided into twelve divisions, each division indicating five minutes of the program. Each of these divisions is in turn divided into five subdivisions, each subdivision indicating one minute of the program. This method of dividing and subdividing the outer time division band affords an accurate indication, at any time of observation, concerning the present and future conditions of the progress of the program. It will be evident of course that other and different time division indicia may be substituted to conform to the preference of a user of the clock, or as may be required by the size of the instrument.

It is to be understood that I have shown and described the invention in one preferred form of embodiment only, merely for purposes of exemplification. The invention is capable of embodiment in other and further modifications. All such modifications to the extent that they embody the principles of the invention as pointed out in the appended claims are to be deemed within the scope and purview thereof.

Having thus described my present invention what I claim and desire to secure by Letters Patent is:

1. A program clock including a face having a central clock dial and an annular area surrounding the circumference of the dial, oppositely facing flanges at the edges of the annular area, a plurality of segments detachably retained by the flanges each bearing indicia corresponding to a program unit, dial time markings carried by the flanges and a clock hand cooperating with the clock dial, the markings and the segments to indicate the elapse of time and the currency of a program unit.

2. A program clock having a clock face and an outer annular area concentric therewith containing indicia representing a variable, multiple-element entertainment program, said annular area being divided into distinct, changeable and detachable segments of varying arcuate lengths each representing a different element of the changeable program, the length of each segment corresponding to the time-duration of the program element represented thereby, a movable hour hand extending outwardly over the annular area, and a member at each edge of the annular area for retaining the segments therein, each member carrying time marking indicia.

FRITZ HUGH THOMAS.